(12) United States Patent
Takada et al.

(10) Patent No.: US 6,727,425 B2
(45) Date of Patent: *Apr. 27, 2004

(54) POWER GENERATION SATELLITE AND TRANSMISSION ANTENNA APPARATUS

(75) Inventors: Kazuyuki Takada, Tokyo (JP); Hiroyuki Satou, Tokyo (JP); Izuru Naito, Tokyo (JP); Izumi Mikami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/184,908

(22) Filed: Jul. 1, 2002

(65) Prior Publication Data
US 2003/0098058 A1 May 29, 2003

(30) Foreign Application Priority Data
Nov. 29, 2001 (JP) .................................. 2001-364033

(51) Int. Cl.[7] ................ H01L 31/042; H01L 31/052; B64G 1/44
(52) U.S. Cl. ................ 136/292; 136/244; 136/246; 244/173; 322/2 R; 342/354; 342/352
(58) Field of Search .................. 136/244, 292, 136/246; 244/173; 322/2 R; 342/354, 352

(56) References Cited

U.S. PATENT DOCUMENTS

| | | | | |
|---|---|---|---|---|
| 3,781,647 A | * | 12/1973 | Glaser | 322/2 R |
| 4,364,532 A | * | 12/1982 | Stark | 244/30 |
| 4,368,415 A | * | 1/1983 | Henderson et al. | 322/2 R |
| 5,019,768 A | * | 5/1991 | Criswell et al. | 322/2 R |
| 6,492,586 B2 | * | 12/2002 | Mikami et al. | 136/292 |
| 6,492,940 B2 | * | 12/2002 | Mikami et al. | 342/354 |
| 6,495,751 B2 | * | 12/2002 | Mikami et al. | 136/292 |
| 6,528,719 B2 | * | 3/2003 | Mikami et al. | 136/292 |
| 2003/0098057 A1 | * | 5/2003 | Mizuno et al. | 136/244 |

OTHER PUBLICATIONS

Brown et al, "Beamed Microwave Power Transmission and its Application to Space," IEEE Transactions on Microwave Theory and Techniques, vol. 40, No. 6, Jun. 1992.*

* cited by examiner

*Primary Examiner*—Alan Diamond
(74) *Attorney, Agent, or Firm*—Oblon, Spivak, McClelland, Maier & Neustadt, P.C.

(57) ABSTRACT

High-output transmitters are applied to a power generation satellite and a transmission antenna apparatus and a transmission antenna having an array antenna with a small number of element antennas and a reflecting mirror antenna is applied, thereby providing a power generation satellite and a transmission antenna apparatus in a space photovoltaic generation system comprising transmission antennas each having performance equivalent to that of a phased array antenna with a smaller number of transmitters and a smaller number of element antennas than those of a transmission antenna implemented as a phased array antenna.

4 Claims, 3 Drawing Sheets

POWER GENERATION SATELLITE AND TRANSMISSION ANTENNA APPARATUS

BACKGROUND OF THE INVENTION

1. Field of the Invention

This invention relates to a power generation satellite and a transmission antenna apparatus in a space photovoltaic generation system in which the sunlight is received and electric power is generated in space and is transmitted through space by a microwave and is accumulated at a power base for use as electric energy.

2. Description of the Related Art

Power generation systems using sunlight include a solar battery as a small scale, a photovoltaic generation panel installed on a building, intended for home use, and the like. The photovoltaic generation on the ground is not always good in efficiency because of atmospheric attenuation of sunlight and lightness and darkness in day and night on the principle. As the photovoltaic generation in space, a solar panel mounted on an artificial satellite is well known and using the solar panel, the artificial satellite generates electric power required for observation, communications, etc., for achieving its mission. In any way, generated power energy by the solar battery wired to a specific machine is used by the specific machine.

On the other hand, a system for receiving sunlight and generating electric power in space and transmitting the electric power to a specific location, such as a specific point on the earth or in space, is supported by the progression of communication technology, the construction technology of a large-scaled space structure, etc., as the result of the recent space development, and is researched and developed vigorously. As an example of such a space photovoltaic generation system, a system is designed wherein a plurality of power generation satellites are placed in space and at each of the power generation satellites, sunlight is condensed and is converted into electric energy and then a microwave from the electric energy is transmitted to a power base on the ground, etc. The power base has an antenna for receiving the microwave from the plurality of power generation satellites and converts the microwave received at the antenna into a DC and combines.

In the space photovoltaic generation system as described above, to enhance the power generation capability in space, it becomes necessary to place a large number of power generation satellites for transmitting a microwave to the ground in space. At present, generally a phased array antenna is studied as an antenna system of transmission antennas each mounted on each of the power generation satellites. In this case, the assumed size of the antenna is about 200 m to about 1 km in diameter and it is considered that the required number of element antennas reaches several ten millions to several hundred millions. Further, to adjust the phase of an output wave from the phased array antenna, as many transmitters as the number similar to the number of element antennas become necessary, and it is very difficult to manufacture a large-sized phased array antenna about 200 m to about 1 km in diameter as the transmission antenna in the space photovoltaic generation system because an extremely large number of element antennas and an extremely large number of transmitters are required; this is a problem.

SUMMARY OF THE INVENTION

It is therefore an object of the invention to provide a power generation satellite and a transmission antenna apparatus in a space photovoltaic generation system having transmission antennas for making it possible to decrease the required number of element antennas and the required number of transmitters wherein electric power generated from sunlight in space is converted into a microwave and then the microwave is transmitted to a power base.

According to the invention, there is provided a power generation satellite having a light condensing optical section, a photoelectric conversion section, a plurality of transmitters, and a transmission antenna. The light condensing optical section condenses sunlight in space. The photoelectric conversion section receives light condensed in the light condensing optical section and generating electric energy. The plurality of transmitters generates microwaves from the electric energy generated by the photoelectric conversion section. The transmission antenna sends the microwaves generated by the transmitters to space. The transmission antenna includes an array antenna having an element antenna for emitting the microwave and a reflecting mirror antenna for reflecting the microwave emitted from the array antenna.

Also, according to the invention, there is provided a transmission antenna apparatus having a photoelectric conversion element, a transmitter, and a transmission antenna. The photoelectric conversion element generates electric energy from incident sunlight. The transmitter generates microwave from the electric energy generated by the photoelectric conversion element. The transmission antenna sends the microwave generated by the transmitters to space. The transmission antenna has an array antenna having an element antenna for emitting the microwave and a reflecting mirror antenna for reflecting the microwave emitted from the array antenna. The photoelectric conversion element is placed on a back of the reflecting mirror antenna.

DETAILED DESCRIPTION OF THE PREFERRED EMBODIMENTS

Embodiment 1

Figure 1:
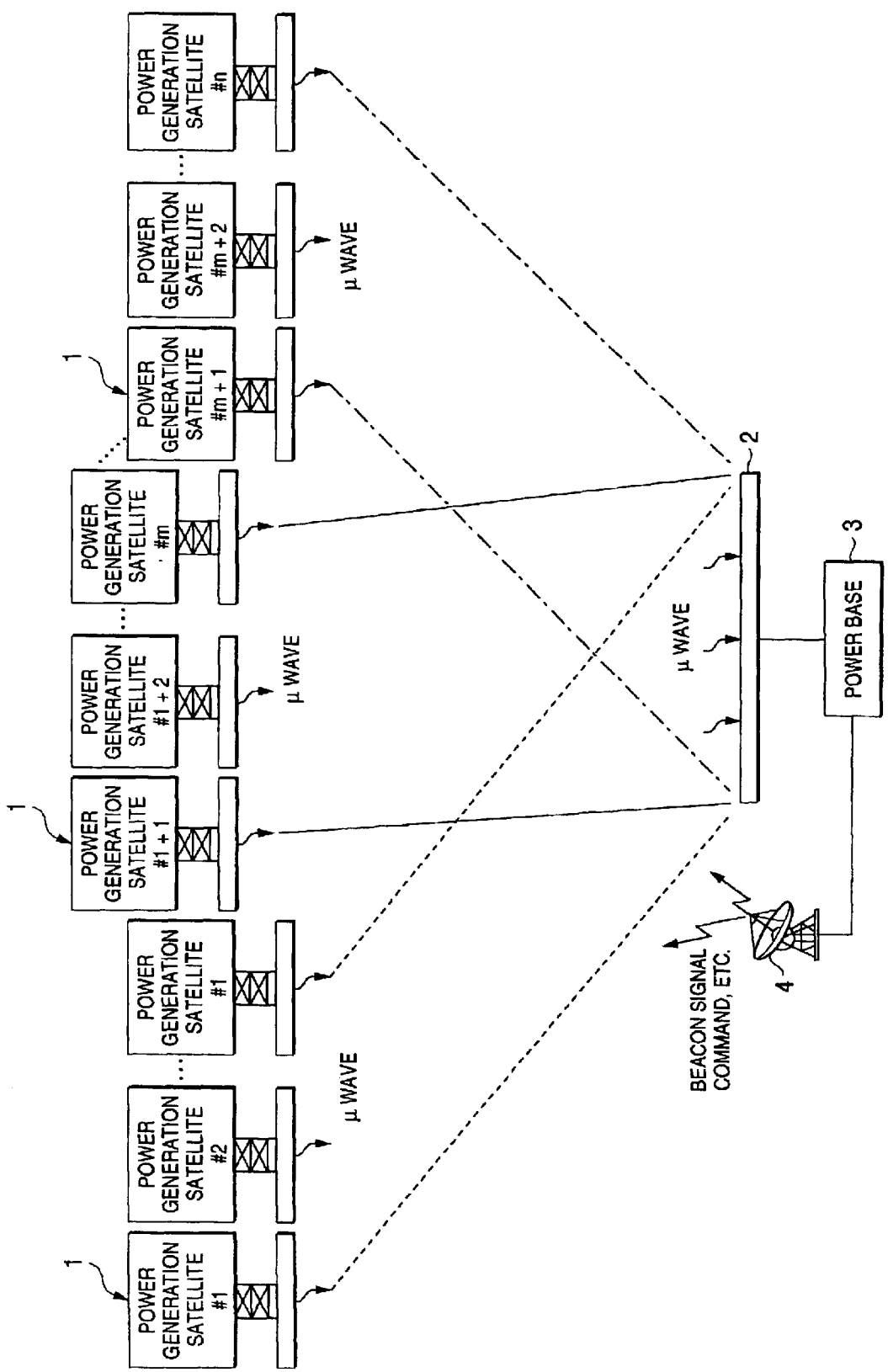
FIG. 1 is a drawing to show power generation satellites in a space photovoltaic generation system according to an embodiment 1 of the invention and the general configuration of the system.
Figure 2:
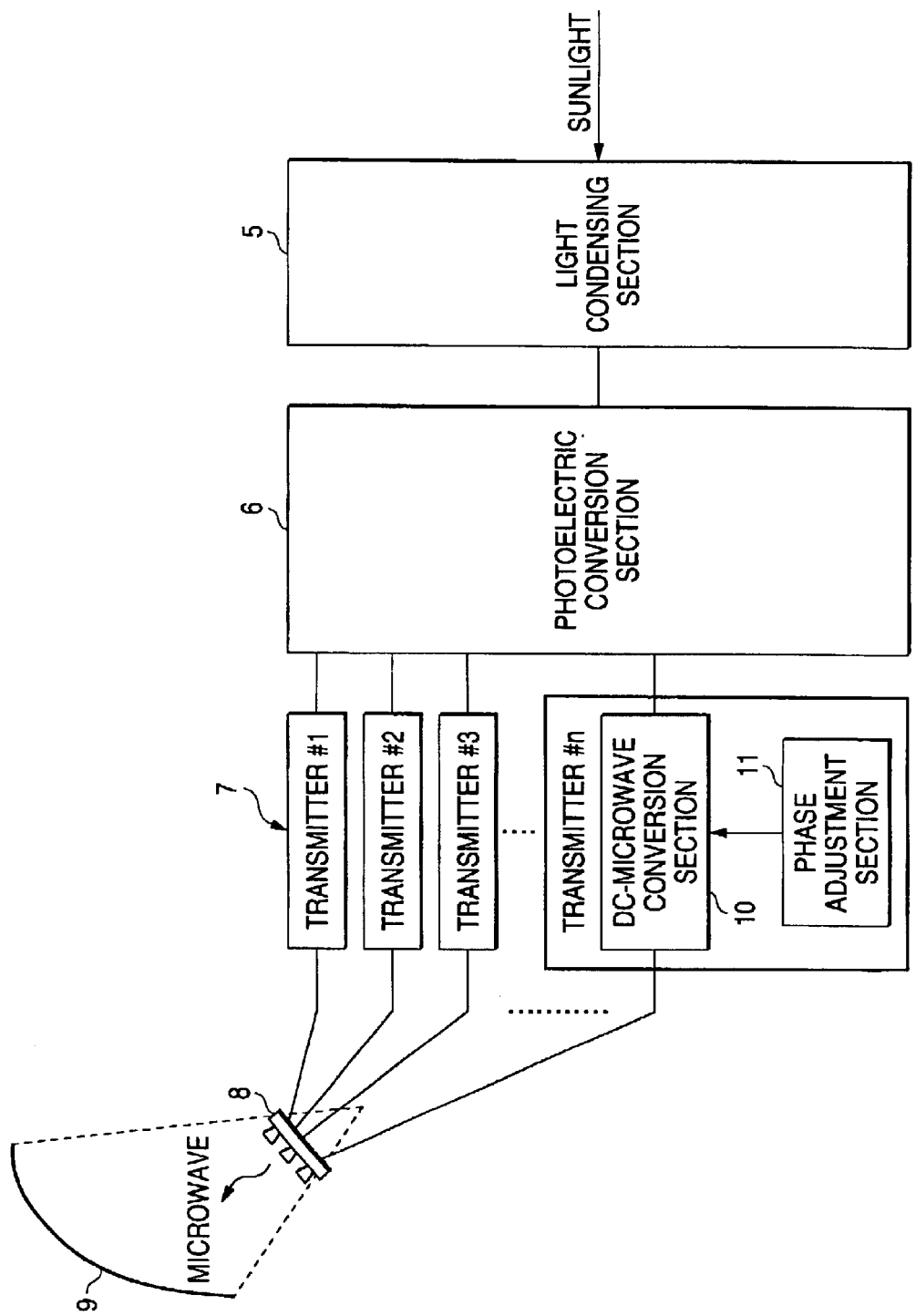
FIG. 2 is a block diagram to show the configuration of the power generation satellite according to the embodiment 1 of the invention.
Figure 3:
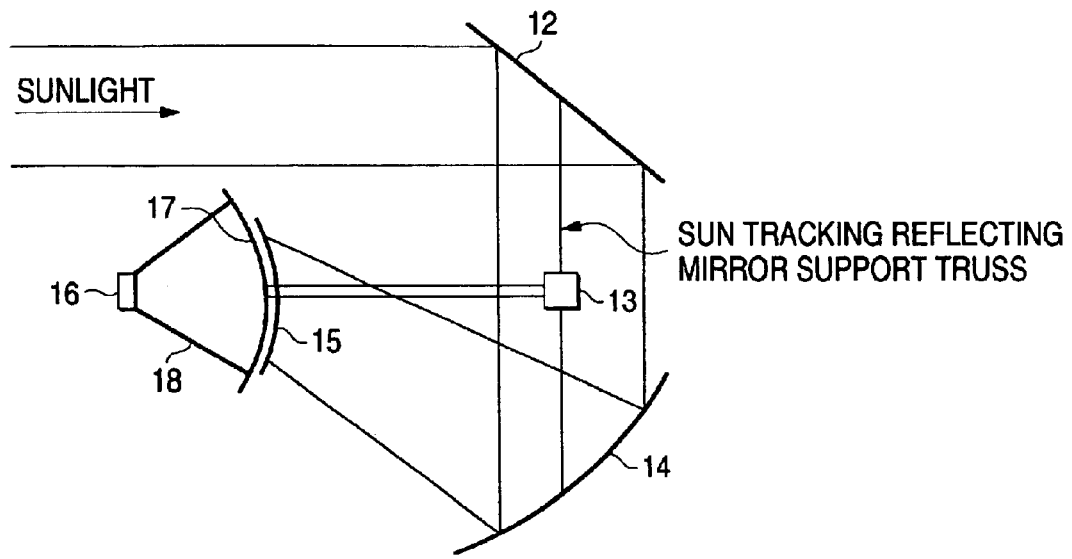
FIG. 3 is a drawing to show the power generation satellite and a transmission antenna apparatus according to the embodiment 1 of the invention.
Figure 4:
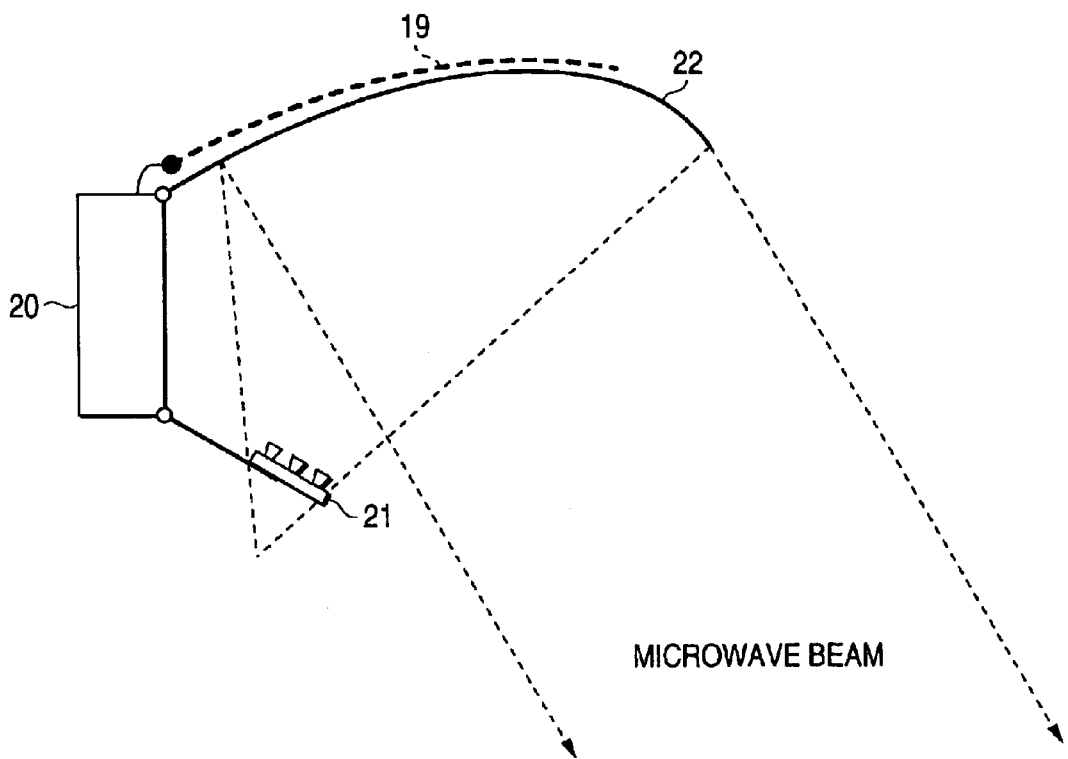
FIG. 4 is a drawing to show an example of a variation of the transmission antenna apparatus according to the embodiment 1 of the invention.

A power generation satellite and a transmission antenna apparatus in a space photovoltaic generation system according to an embodiment 1 of the invention will be discussed with reference to FIGS. 1 to 4. FIG. 1 is a drawing to show power generation satellites in the space photovoltaic generation system according to the embodiment 1 of the invention and the general configuration of the system. FIG. 2 is a block diagram to show the configuration of the power generation satellite according to the embodiment 1 of the invention. FIG. 3 is a drawing to show the power generation satellite and a transmission antenna apparatus according to the embodiment 1 of the invention. FIG. 4 is a drawing to show an example of a variation of the transmission antenna apparatus according to the embodiment 1 of the invention.

In FIG. 1, numeral 1 denotes a power generation satellite for generating electric energy from sunlight in space, generating a microwave from the electric energy, and transmitting the microwave. As shown, a plurality of power generation satellites #1 to #n are placed. Numeral 2 denotes a power base antenna for receiving microwaves from the power generation satellites 1 and numeral 3 denotes a base station for generating electric power from the received microwaves. Numeral 4 denotes a satellite communication antenna for transmitting position information of the power base to the power generation satellites.

The power generation satellite 1 converts the electric energy converted from sunlight into a microwave and transmits the microwave to the power base 3. The electric power of the microwave that can be sent by each power generation satellite 1 is determined by the light condensing capability of sunlight and the photoelectric conversion and microwave amplification capabilities in the power generation satellite. A plurality of the power generation satellites 1 are placed in space, whereby it is made possible to transmit large-power microwaves to the power base 3. Since the beam width of the microwave transmitted as the phase is adjusted in each power generation satellite 1 is determined by the aperture area of an array antenna having transmission antennas mounted on the power generation satellites 1, the beam width of the transmitted microwave can be narrowed without enlarging the aperture area of the transmission antenna of each power generation satellite 1.

The microwaves thus transmitted are received at the power base antennas 2 and undergo low-frequency conversion in the power base 3 for use as electric power. The power base 3 may be installed not only on the ground, but also on the moon, in a space plant facility, etc., for example, in space. To install the power base 3 on the ground, the distance from space to the earth is extremely large and thus the power base antennas 2 may require a vast area reaching an equivalent to several-10-km square. To form such a giant antenna, it is common practice to arrange antennas each of a specific size like an array, for example. Therefore, the power base 3 may also have a combining function of combining the received microwaves from the transmission antennas of the power generation satellites 1 or transmission antenna groups in addition to the low-frequency conversion function.

Further, in FIG. 1, the power base 3 has the satellite communication antenna 4 for sending a beacon signal to each power generation satellite 1. The power generation satellite 1 can recognize the direction of the power base 3 by capturing the beacon signal, and controls the phase adjustment amount of the transmitted microwave of the power generation satellite 1 so as to send the microwave from the power generation satellite 1 in the direction of the power base 3. A power generation satellite control satellite may be provided which has a function of capturing the beacon signal, recognizing the direction of the power base 3, calculating the phase adjustment amount of the transmitted microwave of each power generation satellite 1 so as to send the microwave from the power generation satellite 1 in the direction of the power base 3, and sending the calculated phase adjustment amount to the power generation satellite 1.

Next, the configuration of the power generation satellite will be discussed with reference to FIG. 2. In the block diagram of FIG. 2, numeral 5 denotes a light condensing section for condensing sunlight in space; the light condensing section 5 is implemented as a reflecting optical system, a refraction optical system, etc. Numeral 6 denotes a photoelectric conversion section for receiving light from the light condensing section 5 and converting the light into electric energy. Numeral 7 denotes a transmitter for converting the electric energy generated by the photoelectric conversion section 6 into a microwave whose phase is adjusted. Numeral 8 denotes an array antenna having element antennas of output terminals of the transmitters 7. Numeral 9 denotes a reflecting mirror antenna for reflecting the output microwave emitted from the array antenna 8. In the transmitter 7, numeral 10 denotes a DC-microwave conversion section for converting the DC electric energy generated by the photoelectric conversion section 6 into a microwave. Numeral 11 denotes a phase adjustment section for calculating the phase adjustment amount so as to direct the microwave beam toward the direction of the power base 3 and controlling the phase of the output microwave of the DC-microwave conversion section 10.

Next, converting of sunlight into a microwave and sending of the microwave in the power generation satellite and the transmission antenna apparatus will be discussed. The light condensing section 5 condenses sunlight incident on the power generation satellite and the transmission antenna apparatus. As the sunlight is thus condensed, the density of energy received by the photoelectric conversion section 6 formed of solar batteries can be enhanced and therefore the sunlight is condensed. The light condensing section 5 may be implemented as a reflecting mirror reaching a diameter of several 10 m. Of course, the photoelectric conversion section 6 may directly receive sunlight without providing the light condensing section 5. The photoelectric conversion section 6 has an arrangement of solar panels for receiving the condensed sunlight from the light condensing section 5 or directly receiving sunlight and converts the sunlight into electric energy. The electric energy generated by the photoelectric conversion section 6 is input to the DC-microwave conversion sections 10 in the transmitters 7 and is converted into microwaves. Output of the solar battery generally is a DC component and thus is transformed and stabilized appropriately for input. The phase adjustment sections 11 adjusts the phases of the microwaves generated by the DC-microwave conversion sections 10 so that the output microwave beam of the whole transmission antenna having the array antenna 8 and the reflecting mirror antenna 9 is directed toward the direction of the power base 3. The output terminals of the transmitters 7 are placed on the array antenna 8 as the element antennas thereof. Therefore, the phases of the microwaves are adjusted in response to the positions where the output terminals of the transmitters 7 are placed on the array antenna 8. The output microwaves of the transmitters 7 with the phases adjusted by the phase adjustment sections 11 are emitted from the array antenna 8 and are reflected on the reflecting mirror antenna 9, forming a microwave beam. Therefore, the reflecting mirror antenna 9 is shaped so that it can form any desired microwave beam. The microwave beam formed by the reflecting mirror antenna 9 has the phases adjusted by the phase adjustment sections 11 in the transmitters 7 and thus is directed toward the direction of the power base 3.

In FIG. 2, the photoelectric conversion section 6 may comprise a storage battery for storing electric energy generated by a plurality of solar panels depending on conditions of the orbit into which the power generation satellite is hoisted, etc. The electric energy input to each of the transmitters 7 may be generated separately for each transmitter or a large amount of electric energy may be generated at a time and distributed to the transmitters 7.

Next, an example of the configuration of the power generation satellite and the transmission antenna apparatus will be discussed with reference to FIG. 3. In FIG. 3, numeral 12 denotes a sun tracking reflecting mirror being always directed toward the direction of the sun; the mirror surface is plane. Numeral 13 denotes a satellite bus section for controlling the power generation satellite in various ways and also communicating with the power base 3 and the control satellite. Numeral 14 denotes a fixed light condensing mirror for condensing sunlight guided by the sun tracking reflecting mirror 12; the mirror surface is concave. Numeral 15 denotes a photoelectric conversion section for generating electric energy from the sunlight condensed by the fixed light condensing mirror 14; the photoelectric conversion section 15 has a plurality of solar panels. Numeral 16 denotes an array antenna for converting the electric energy generated by the photoelectric conversion section 15 into a microwave and emitting the microwave. Numeral 17 denotes a reflecting mirror antenna for reflecting the output microwave of the array antenna 16. Numeral 18 denotes an array antenna support truss for supporting the array antenna 16.

Next, converting of sunlight into a microwave and sending of the microwave in the power generation satellite shown in FIG. 3 will be discussed. Sunlight incident on the power generation satellite is reflected by the sun tracking reflecting mirror 12 and is guided to the fixed light condensing mirror 14. The sunlight guided to the fixed light condensing mirror 14 is incident as a collimated light beam. Since the fixed light condensing mirror 14 is a concave mirror, the sunlight reflected on the fixed light condensing mirror 14 is condensed on the photoelectric conversion section 15. The photoelectric conversion section 15 is placed on the back of the reflecting mirror antenna 17 and the condensed sunlight is applied to the photoelectric conversion section 15, which then generates electric energy from the sunlight. The electric energy generated by the photoelectric conversion section 15 is transmitted to the array antenna 16 via a power transmission cable. The power transmission cable is made to crawl along the array antenna support truss 18, so that it does not interfere with the output microwave beam. The transmitters 7 shown in FIG. 2 are housed in the cabinet of the array antenna 16 and the electric energy generated by the photoelectric conversion section 15 is input to each transmitter in the array antenna 16. The electric energy is converted into a microwave with the phase adjusted in the transmitter and the microwave is emitted from the array antenna 16. That is, the microwaves with the phases adjusted are emitted from the transmitters and a microwave beam is formed. The microwave beam output from the array antenna 16 is reflected on the reflecting mirror antenna 17 and any desired microwave beam with the beam width also adjusted is output.

The sun tracking reflecting mirror 12 in FIG. 3 can rotate 360 degrees with a sun tracking reflecting mirror support truss as a rotation axis so that it can always be directed to the sun direction.

The DC-microwave conversion section in the transmitter housed in the array antenna 16 in FIG. 3 uses high-output DC-microwave conversion elements such as magnetrons, whereby even a small number of element antennas can generate a high-output microwave equivalent to that generated through an array antenna using a large number of low-output DC-microwave conversion elements such as low-output semiconductor amplifiers. However, generally the aperture area of a phased array antenna having a small number of element antennas is smaller than that of a phased array antenna having a large number of element antennas, and the beam width of the transmitted microwave beam of the phased array antenna having a small number of element antennas becomes larger than that of the phased array antenna having a large number of element antennas. Then, the output microwave beam of the array antenna 16 can be reflected on the reflecting mirror antenna 17 for suppressing the spread of the beam width so as to provide output and the spread of output microwave beam equivalent to those of the phased array antenna having a large number of element antennas.

The photoelectric conversion section 15 is placed on the back of the reflecting mirror antenna 17 (when the face of the reflecting mirror antenna 17 opposed to the array antenna 16, namely, the reflecting mirror face is assumed to be the surface, the back). A photoelectric conversion section support truss may be placed on the back of the reflecting mirror antenna 17 to place the photoelectric conversion section 15, or the photoelectric conversion section 15 may be formed of a thin-film or flexible material and be installed directly on the back of the reflecting mirror antenna 17. A plurality of the photoelectric conversion sections 15 may be placed on the back of the reflecting mirror antenna 17 if condensed sunlight is applied to the location where the photoelectric conversion sections 15 are placed. Of course, the photoelectric conversion section 15 may be placed at any other part other than the back of the reflecting mirror antenna 17.

In FIG. 3, the portion having the photoelectric conversion section 15, the array antenna 16, the reflecting mirror antenna 17, and the array antenna support truss 18 having the functions of power generation, conversion of electric energy to a microwave, and microwave transmission can be thought of as a transmission antenna apparatus independently of the power generation satellite. The simplest configuration of the space photovoltaic generation system can be provided by placing a plurality of the transmission antenna apparatus in space.

Next, FIG. 4 shows another configuration example of the transmission antenna apparatus. In the figure, numeral 19 denotes a photoelectric conversion section having a plurality of solar panels. Numeral 20 denotes a transmitter. Numeral 21 denotes an array antenna of an output microwave of the transmitter 20. Numeral 22 denotes a reflecting mirror antenna for reflecting an output microwave of the array antenna 21 and forming any desired microwave beam.

It is not necessary for the transmitter 20 of the transmission antenna apparatus to be integral with the antenna array 21 as shown in FIG. 4; various configurations may be possible depending on conditions of the size of the transmission antenna made up of the array antenna 21 and the reflecting mirror antenna 22, the configurations of the artificial satellite installing the transmission antenna apparatus and a ground power transmission facility, and the like. FIG. 4 shows the configuration applied when the size of the transmission antenna made up of the array antenna 21 and the reflecting mirror antenna 22 is comparatively small.

According to the invention, in a space photovoltaic generation system wherein electric power generated from sunlight is converted into a microwave in a plurality of power generation satellites in space and the microwave is transmitted to a power base and electric power is generated at the power base, to transmit a microwave from a array antenna with a small number of element antennas in the direction of the power base, the phase of the microwave is adjusted and then the microwave is reflected on a reflecting mirror antenna and is transmitted to the power base, whereby an increase in the number of transmitters and the number of element antennas can be suppressed and a photoelectric conversion section is placed on the back of the reflecting mirror antenna, so that power generation and transmission units can be combined into one unit.

What is claimed is:

1. A power generation satellite, comprising:
    a light condensing optical section configured to condense sunlight in space;
    a photoelectric conversion section configured to receive light condensed in the light condensing optical section, and to generate electric energy;
    a plurality of transmitters configured to generate microwaves from the electric energy generated by the photoelectric conversion section; and
    a transmission antenna configured to send the generated microwaves to space,
    wherein the transmission antenna comprises:
        a phased array antenna having an element antenna configured to emit the plurality of microwaves; and
        a reflecting mirror antenna configured to reflect the plurality of microwaves emitted from the array antenna.

2. The power generation satellite according to claim 1, wherein at least one of the plurality of transmitters configured to adjust a phase of a generated microwave and outputs a phase adjusted microwave.

3. The power generation satellite according to claim 1, wherein the photoelectric conversion section is placed on a back of the reflecting mirror antenna.

4. A transmission antenna apparatus, comprising:
    a photoelectric conversion element configured to generate electric energy from incident sunlight;
    a transmitter configured to generate microwaves from the electric energy generated by the photoelectric conversion element; and
    a transmission antenna configured to send the microwaves generated by the transmitter to space,
    wherein the transmission antenna comprises:
        a phased array antenna having an element antenna configured to emit the microwaves; and
        a reflecting mirror antenna configured to reflect the microwaves emitted from the array antenna; and
        wherein the photoelectric conversion element is placed on a back of the reflecting mirror antenna.

* * * * *